April 25, 1967  W. ANGST  3,315,905
DRIVE MECHANISM FOR A WINDING MACHINE
Filed Aug. 27, 1965
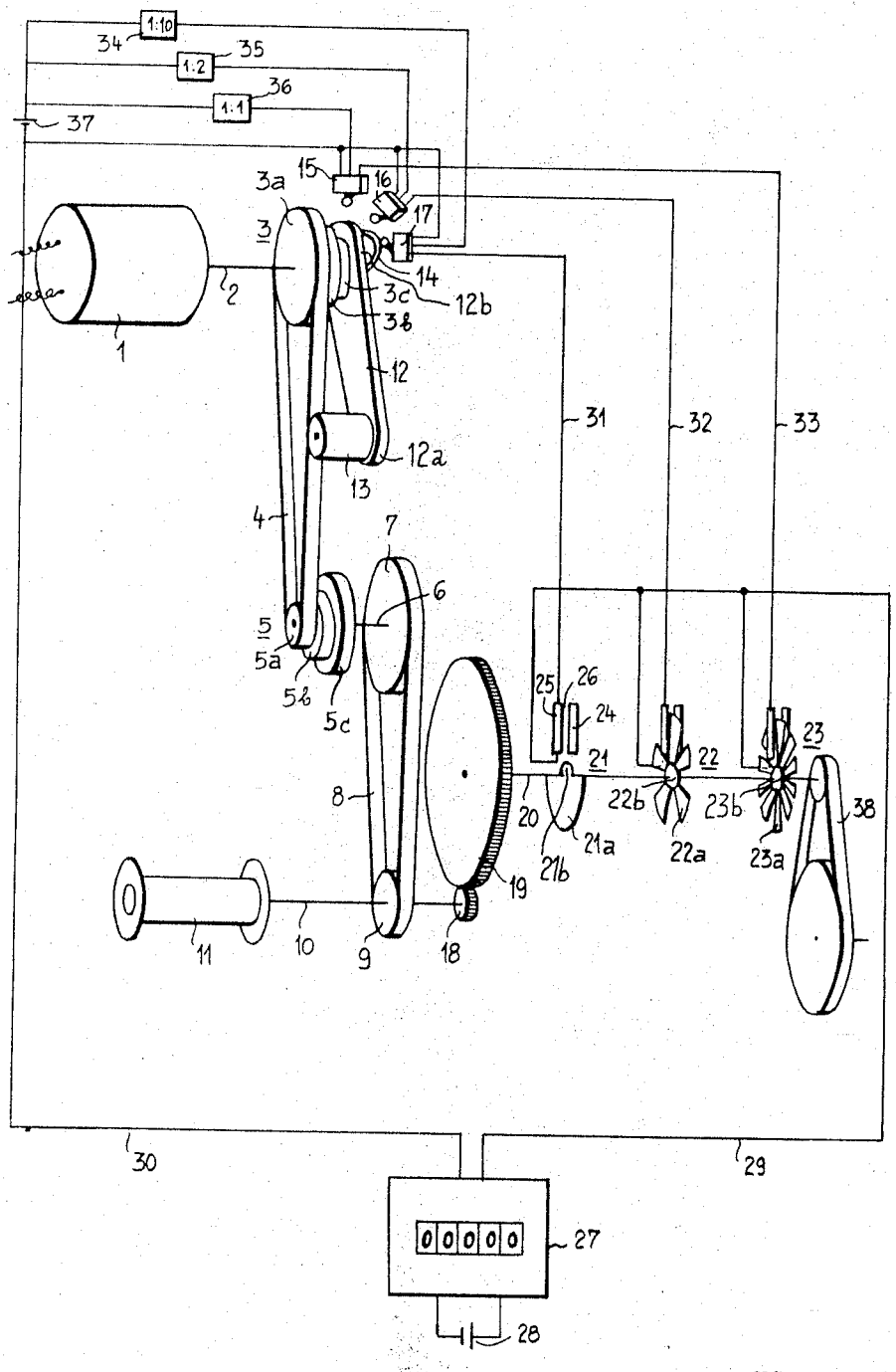
INVENTOR
WALTER ANGST
BY Werner W. Kleeman
His Attorney

United States Patent Office 3,315,905
Patented Apr. 25, 1967

3,315,905
DRIVE MECHANISM FOR A WINDING MACHINE
Walter Angst, Kloten, Switzerland, assignor to Meteor AG., Glattbrugg, Switzerland, a corporation of Switzerland
Filed Aug. 27, 1965, Ser. No. 483,049
Claims priority, application Switzerland, Apr. 22, 1965, 5,639/65
10 Claims. (Cl. 242—25)

The present invention has reference to an improved drive mechanism for a winding machine, in particular for the winding of wire coils upon bodies.

In winding machines which serve to wrap spool bodies or the like with wire it is conventional to operatively couple the winding spindle with a counter in order to be able to place a predetermined number of wire turns or coils upon the spool body. More specifically, winding machines are known to the art in which electromechanical counters have come into use which are actuated by a signal transmitter coupled with the winding spindle. The rotational speed of the winding spindle is generally variable by means of an infinitely variable drive in order to accommodate such to the winding operation, yet with a view towards economy in manufacture of such coil bodies the winding operation is carried out with as high rotational speed as possible. On the other hand, the permissible rotational speed of the counter and the possible counting frequency is limited, and, insofar as counters working at winding spindle-rotational speeds of over about 5,000 r.p.m. are still able to even operate, the longevity is limited and there continually exists the danger of disturbances.

Accordingly, an important object of this invention is directed to an improved drive mechanism for winding machines which overcomes the mentioned disadvantages.

A more specific object of this invention concerns the provision of an improved drive mechanism for a winding machine which effectively prevents limitation of the efficiency of the winding machine due to the maximum counting frequency of the conventional electromechanical counters, without having to resort to using considerably more expensive electronic counters.

The inventive drive mechanism or system for a winding machine having a winding spindle operatively connected with an electromechanical counter through the agency of a signal transmitter positively driven with such winding spindle, and where a drive means or mechanism is provided for driving the winding spindle with a number of different rotational speeds, is characterized by the features that selector means are provided which cooperate with the drive means, and a plurality of signal transmitters are driven by the winding spindle, each such signal transmitter being associated with one of the rotational speeds of the winding spindle and each exhibiting a different pulse recurrence frequency per unit of rotation of the winding spindle. Furthermore, the selector means include interrupters located at the leads or connections of the signal transmitters with the counter and during each speed of rotation a single interrupter is closed in such a manner that, with the largest speed of rotation of the winding spindle the signal transmitter with the lowest pulse repetition frequency is effective upon the counter and with the smallest speed of rotation the signal transmitter with the largest pulse repetition frequency is effective upon the counter.

Since the counter during the largest speed of rotation of the winding spindle is positively operated by the signal transmitter with the smallest pulse recurrence frequency per rotation of such spindle and, in so doing, for instance only for each five or ten revolutions of the spindle is there generated an impulse, at any rate it is possible to prevent an overburdening of the counter.

Other features, objects and advantages of the invention will become more readily apparent by reference to the following detailed description and single drawing in which there is schematically illustrated an exemplary embodiment of inventive drive mechanism.

Considering now this single figure, it will be understood that reference character 1 designates an electric drive motor for a winding machine for winding wire coils about bodies or spools 11. Drive motor 1 has a drive shaft 2 upon which is seated a three-stage belt pulley 3, the different speed stages being designated at 3a, 3b and 3c respectively. The belt pulley 3 is in driving connection with another three-stage belt pulley 5—the speed stages also designated by 5a, 5b and 5c respectively—through the agency of a pulley belt 4. Belt pulley 5 is seated upon an intermediate shaft 6 which carries a further belt pulley 7 of larger diameter than this belt pulley 5. The belt pulley 7 is in driving connection with a belt pulley 9 by means of a pulley belt 8. Belt pulley 9, in turn, is seated upon a drive shaft or spindle 10 carrying the spool body 11 which is to be wound or wrapped with wire (not shown).

A tensioning arm 12 is rotatably arranged at the shaft 2 and tensions the pulley belt 4 by means of a tensioning roller 13 arranged at its free end 12a. In so doing, the position of the tensioning arm 12 is dependent upon whatever stage 3a to 3c and 5a to 5c of the belt pulleys 3 and 5 respectively, the pulley belt 4 travels. Consequently, the position of the tensioning arm 12 is also a measure for the rotational speed of the drive shaft 10 which is stepped-up by the pulley drive arrangement 7, 8, 9. A control cam 14 is mounted at the articulated end 12b of the tensioning arm 12 which cooperates and closes a respective interrupter switch 15, 16 and 17 in each of the three positions corresponding to the speed transmission stages.

It will also be recognized that a pinion 18 is seated at the winding shaft or spindle 10 and meshes with a gear 19. Gear 19 is assumed to have ten times the number of teeth of pinion 18. This gear 19 drives a shaft 20 at which are seated three impulse disks 21b, 22b and 23b. Whereas the disk 21b only carries a single radial flap or tab 21a, the disk 22b has five flaps or tabs 22a which are spaced from one another and circumferentially distributed, while the remaining disk 23b exhibits ten such spaced and circumferentially distributed flaps 23a. The disks 21b, 22b and 23b form components of signal transmitters 21, 22 and 23 respectively, which additionally possess a respective permanent magnet 24 and a respective so-called reed switch 25. It is to be understood that switch 25 and associated magnet 24 are separated from one another by an air gap 26 through which move the flaps 21a, 22a, 23a, of the associated disks 21b, 22b and 23b respectively, upon rotation of the shaft 20. The magnets 24 hold the associated reed switch 25 closed under the action of the undisturbed magnetic lines of force effective through the relevant air gap. However, as soon as a flap moves into the associated air gap then the corresponding reed switch 25 is opened since the magnetic lines of force can then flow through the associated disk. As a result, upon each passage of a flap through the associated air gap a switching operation results, so that in accordance with the number of flaps for each revolution of the shaft 20 the impulse or signal transmitter 21 generates one impulse, the impulse or signal transmitter 22 five impulses, and the impulse or signal transmitter 23 ten impulses. Since the shaft 20 travels ten times slower than the spindle 10, the impulse transmitter 21 only generates one impulse for each 10 revolutions of the spindle 10, the impulse transmitter 22 one impulse every second revolution of the spindle 10, and the impulse transmitter 23 an impulse for every revolution of the spindle 10.

An electromechanical counter 27 provided with a current source 28 is connected, on the one hand, with all of the three switches 25 by means of a lead or conductor 29, and on the other hand, counter 27 is operatively connected via a lead or conductor 30 with all three interrupter switches 15, 16 and 17.

As can be clearly recognized by inspecting the drawing each interrupter switch is connected with a given reed switch 25. Specifically, the interrupter switch 17 which is closed during the largest rotational speed of the spindle 10 is connected via a lead or conductor 31 with the switch 25 of the impulse or signal transmitter 21, the interrupter switch 15 closed during the smallest rotational speed of the spindle 10 is connected via a lead or conductor 33 with the switch 25 of the impulse transmitter 23, and the interrupter switch 16 closed during the intermediate rotational speed of the spindle 10 is connected with the switch 25 of the impulse transmitter 22 via a lead or conductor 32. In so doing, it is assumed that the tensioning arm 12 and also the cam 14 during change of the transmission ratio from the largest to the smallest rotational speed of the spindle 10 moves in counterclockwise direction.

Consequently, during operation, it happens that only during the smallest rotational speed of the spindle 10 each rotation of the same generates a counting impulse since the then closed interrupter switch 15 only transmits the impulses of the impulse transmitter 23; both of the other interrupter switches 16 and 17 are open. In analogous manner, when working in the intermediate rotational speed, each second rotation of the spindle 10 is indicated via the interrupter switch 16 which, in this case, is then closed, whereas the counter 27 when working with the largest rotational speed records each tenth rotation of the spindle 10.

In order to simplify evaluation of the counter reading it is possible to indicate the relationship of the recorded rotations to the actual number of rotations of the spindle 10 for each of the three rotational speeds. To this end, there are provided appropriate luminous or illuminating disks or panels 34, 35 and 36 which carry corresponding proportionality data and, on the one hand, are connected to a common current source or power supply 37, and, on the other hand, to the corresponding interrupter switches 17, 16 and 15 respectively. In accordance with the closing of one of the interrupter switches the corresponding luminous disk or panel is thus lit up.

Advantageously, the drive for the feed of the non-illustrated wire guide member is taken off the shaft 20, as such has been schematically depicted by the pulley drive 38. It is here also remarked that while the exemplary embodiment discloses a drive means which, for example, uses a belt pulley arrangement, other drives are possible, such as for instance gear systems and/or variable speed motors. Moreover, while the selector mechanism in the case considered employs a tension arm having a cam cooperating with interrupter switches, other physical structures of such selector mechanism are readily possible. What is important is that whatever the construction of such selector mechanism is, it should be able to automatically couple in a given impulse transmitter with the counter as a function of the selected driving speed of the spindle.

While there is shown and described a present preferred embodiment of the invention it is to be distinctly understood that the invention is not limited thereto but may be otherwise variously embodied and practised within the scope of the following claims.

What is claimed is:

1. Drive system for a winding machine, comprising a winding spindle, drive means for selectively driving said winding spindle at different rotational speeds, a respective impulse transmitter for each possible rotational speed of said winding spindle operated by said winding spindle, each impulse transmitter for each rotational speed of the winding spindle generating signals having a given pulse recurrence frequency with regard to each rotation of the winding spindle, with the pulse recurrence frequency of the generated signals of each impulse transmitter differing from one another, a counter mechanism operably connected with said impulse transmitters for enabling determination of the number of revolutions performed by said winding spindle at any given time during its rotation, and selector means for operably coupling a given impulse transmitter with said counter mechanism as a function of the selected rotational speed imparted to said winding spindle by said drive means, so that with the greatest rotational speed of said winding spindle the impulse transmitter with the smallest pulse recurrence frequency is operable upon said counter mechanism and with the smallest rotational speed of said winding spindle the impulse transmitter with the largest pulse recurrence frequency is operable upon said counter mechanism.

2. Drive system for a winding machine as defined in claim 1 further including a shaft member driven by said winding spindle operably connected with at least one of said impulse transmitters, speed reduction transmission means for transmitting power from said winding spindle to said shaft member such that said shaft member is driven at a predetermined reduced rotational speed with respect to the rotational speed of said winding spindle.

3. Drive system for a winding machine as defined in claim 2 wherein each impulse transmitter is operably connected with said driven shaft member, each impulse transmitter incorporating a given number of flap members seated upon and circumferentially distributed about said driven shaft member, the number of flap members of any one impulse transmitter differing from the number of flap members of any other impulse transmitter.

4. Drive system for a winding machine as defined in claim 2 wherein each impulse transmitter comprises a switch member in circuit with said counter mechanism, a permanent magnet spaced from said switch member to provide an air gap, and at least one flap member carried by said driven shaft member movable into said air gap.

5. Drive system for a winding machine as defined in claim 1 wherein said drive means comprises a drive motor and a variable speed transmission unit, said variable speed transmission unit being operatively disposed between said drive motor and said winding spindle, said selector means being operably associated with said variable speed transmission unit.

6. Drive system for a winding machine as defined in claim 5 wherein said selector means is responsive to the selected rotational speed of the winding spindle for automatically operably coupling a given impulse transmitter with said counter mechanism.

7. Drive system for a winding machine as defined in claim 5 wherein said selector means incorporates a respective interrupter switch in circuit with each impulse transmitter, cam means operated by said drive means for selectively operating a given interrupter switch in accordance with the rotational speed imparted to said winding spindle by said drive means.

8. Drive system for a winding machine as defined in claim 7 wherein said variable speed transmission unit comprises a multiple-speed pulley arrangement, said selector means further including a tensioning arm cooperating with said pulley arrangement and carrying said cam means.

9. Drive system for a winding machine as defined in claim 7 further including indicator means operated by said interrupter switches for automatically indicating a proper correction factor for the counter mechanism so that it is possible to determine the exact number of revolutions performed by said winding spindle at any given time during its rotation.

10. Drive system for a winding machine, comprising a winding spindle, drive means for driving said winding spindle at different preselected rotational speeds, a respective impulse transmitter provided for each possible rotational speed of said winding spindle operated by said winding spindle, each impulse transmitter for each rotational speed of the winding spindle generating signals having a given pulse recurrence frequency with respect to each rotation of the winding spindle, with the pulse recurrence frequency of the generated signals of each impulse transmitter differing from one another, an electromechanical counter mechanism operably connected with said impulse transmitters for enabling determination of the number of revolutions performed by said winding spindle at any given time during its rotation, and selector means for operably coupling a given impulse transmitter with said electromechanical counter mechanism in dependency upon the selected rotational speed imparted to said winding spindle by said drive means.

References Cited by the Examiner

UNITED STATES PATENTS

| | | | |
|---|---|---|---|
| 3,128,956 | 4/1964 | Schumann | 242—25 X |
| 3,217,991 | 11/1965 | Band | 242—25 |

FRANK J. COHEN, *Primary Examiner.*

N. L. MINTZ, *Assistant Examiner.*